United States Patent [19]

Drechsel et al.

[11] 4,401,368
[45] Aug. 30, 1983

[54] PROJECTING SCREEN FOR OPTICAL PURPOSES

[75] Inventors: Ludwig Drechsel, Jena; Margarete Lasch, Jena-Lobeda, both of German Democratic Rep.

[73] Assignee: Jenoptik Jena GmbH, Jena, German Democratic Rep.

[21] Appl. No.: 309,659

[22] Filed: Oct. 8, 1981

[30] Foreign Application Priority Data

Dec. 23, 1980 [DD] German Democratic Rep. ... 226555

[51] Int. Cl.³ .............................................. G03B 21/60
[52] U.S. Cl. ..................................... 350/126; 350/120
[58] Field of Search .............................. 350/126, 120

[56] References Cited
U.S. PATENT DOCUMENTS 3,655,262  4/1972  DePalma .......................... 350/126
3,705,757 12/1972  Huber .............................. 350/126
3,712,707  1/1973  Henkes, Jr. ..................... 350/126 X
3,751,135  8/1973  Clausen et al. ................. 350/126 X
4,140,369  2/1979  Howland .......................... 350/126
4,165,153  8/1979  Land .............................. 350/126
4,184,762  1/1980  Guzman .......................... 350/126 X Primary Examiner—Richard A. Wintercorn
Attorney, Agent, or Firm—Jordan and Hamburg

[57] ABSTRACT

A projecting screen for optical purposes which meets the stringent requirements for the reproduction of macroscopic as well as microscopic images in transmission operation. The object comprises providing a projection screen comprising several scattering media movable in relation to each other, by which projected images may be reproduced free of grain- and flickering- or scintillation effects, under simultaneous improvement of the resolution and the transmission qualities. The substance of the invention comprises a projecting screen in which two solid inorganic or organic media are movably assembled in relation to each other, of which one or both may be light-scattering because of surface roughness on one side, and a liquid flowing between these two means which may or may not have a scattering effect. This invention is of multiple use in the construction of scientific instruments.

19 Claims, 2 Drawing Figures

PROJECTING SCREEN FOR OPTICAL PURPOSES

BACKGROUND OF THE INVENTION AND PRIOR ART STATEMENT

The present invention relates to a projecting screen for optical purposes, which fulfills the stringent requirements for the reproduction of macroscopic as well as microscopic pictures in transmission operation. The invention has many possibilities of application in the construction of scientific instruments, especially where highly accurate evaluation of the information reproduced on the screen is required.

As a rule, projecting screens comprise surface optical components which scatter the traversing light due to mechanical processing of their surface or appropriate formation of their surface. Projecting screens have also been known that have been made light-scattering by means of a matrix of scattering particles provided throughout its entire volume. A high yield of scattered light, hereinafter called transmission, and a high resolution for reproducing small details are additionally of great importance for the performance of projecting screens besides a scattering capacity. Although these requirements can largely be met by the known projecting screens, a substantial flaw exists in that the projected reproductions are not free from grain structures and flickering or scintilation effects. The latter effect becomes physiologically disturbing, especially on extended subjective viewing of the projected images and also affects recognition of the fine reproduction details. This results from the fact that the light traversing the projecting screens, besides scattering, is also subjected to refraction and reflection on the surfaces of the scattering structural elements.

In order to prevent flickering or scintillating effects as well as grain structures, a projecting screen arrangement is known comprising two scattering media which are in direct surface contact or are arranged opposite each other with a small air gap in between, which are slowly moved relative to each other in rotation or in translation (GB-PS No. 592,815). The disadvantage of this arrangement is that transmission is worsened. Since vibration of the whole arrangement caused by the motion processes cannot be prevented, the resolution is also lowered.

To overcome these flaws, the prior art has come up with projecting arrangements in which two media having light-scattering surfaces execute an oscillating linear movement in relation to each other through electromagnetic excitation (AT-PS No. 195,666; US-PS No. 4,143,943). Not considering the relatively high costs of such equipment, the main flaw of these arrangements is that the flickering or scintillating effects cannot be completely prevented. Depending on the corresponding amplitude of the oscillation, resonance conditions are formed which lead to the formation of zones in the projected images where the flickering or scintillating effects as well as grain structures appear as before and reduced resolution persists. The resonance conditions may also trigger vibration effects in the projecting screen arrangements which hamper evaluation of the images. The prior art has also proposed inserting two scattering disks with different scattering capacities, wherein only the less scatterable disk is movable with movement carried out at relatively low speeds or amplitudes (DE-OS No. 1,945,486; DE-OS No. 2,138,340). Although the flickering and scintillating effects can largely be excluded in this manner and the resonance and vibration conditions of the whole arrangement can be prevented, this type of projecting screen has insufficient transmission qualities and a yet too reduced resolution. A projecting screen arrangement has also been known in which a mixture of scattered particles and air is blown through past behind a scatter disk (US-PS No. 2,906,169). Not considering the high expenditures with equipment, this arrangement does not result in uniformity of the optical effects over a larger viewing field for scientific evaluation of the information represented on the screen and is also not feasible. Such an arrangement is not appropriate for high resolutions. Transmission qualities are insufficient.

Finally, the prior art discloses a transmitted light projection system which corresponds to a large liquid crystal cell in regard to its arrangement (DE-OS No. 2,138,118). By providing an electric field, it is possible to practically remove the flickering or scintillating effect and to create a grain-free image. Substantial disadvantages arise, however, from the limited life span of such systems. Moreover, their operational efficiency depends largely on the temperature so that substantial additional expenses have to be incurred with equipment. The indicated resolution of 20 linear pairs per mm is not sufficient in microscopic requirements.

All known technical solutions have the common flaw that the flickering or scintillating effects and the grain structure cannot be effectively removed without negatively affecting the other extremely important qualities, such as resolution and transmission.

The object of the present invention is to create a projecting screen for optical purposes in which the flaws and disadvantages of the prior art can be avoided. In particular, a projecting screen is created which ensures high quality and adherence to detail in the reproduction and evaluation of the projected images, moreover, making viewing for extended periods possible without problems.

SUMMARY OF THE INVENTION

This invention covers a projecting screen for optical purposes which comprises several scattering media movable in relation to each other, by which a grain- and flickering-free or scintillation-free reproduction of the projected images is made possible, and which at the same time improves the resolution and transmission qualities.

Respecting the goal and object, the features of the solution of the present invention are providing two solid inorganic or organic media, one or both of which may be light-scattering by means of a surface roughness on one side 4.5 $\mu$m to 17 $\mu$m deep, between which there is a liquid with or without a scattering effect, with these two media and said liquid arranged to be movable towards each other, the distance between the two solid media herein 0.004 to 0.5 mm, and the refractive index difference between the two solid media and the liquid $\Delta n_d^{20} = 0.180$ to $0.350$. Another feature of the invention is that two solid light-scattering media enclose an intermediate space filled with a non-scattering liquid, wherein the solid medium facing away from the observer is arranged to be movable.

Another advantageous embodiment of the present invention comprising a solid light-scattering medium on the side facing the observer and a second solid, non-scattering medium, which are both rigidly mounted, enclosing an intermediate space through which a liquid flows comprising scattering inorganic or organic solid particles of a grain size from 1 to 10 μm.

The solid means employed in projecting screens according to the present invention comprises glass disks. However, disks of organic polymers may also be successfully employed for optical purposes, such as, for instance, polymethacrylic or acrylic acid ester, polyesters of isomeric phthalic acids, polycarbonates, polydiethylene glycol-bisallylcarbonates, among others, as well as their copolymers. To fill the intermediate spaces between the solid media, it is advantageous to use liquids, such as water, alcohols, glycol ethers, esters, halogenated hydrocarbons and their mixtures. To lend light-scattering qualities to the liquid, solid substances are employed, such as, for instance, highly dispersive silicic acid, as well as polyethylene powder, polyvinyl alcohol and similar products.

The projecting screens of the present invention make it possible to reproduce projected images with a resolution of at least 25 linear pairs per mm and a transmission of at least 80%, which is grain-, flickering- and scintillation-free, without imaging of the filament occurring. Highly precise and literally detailed evaluations of the projected images are thereby made possible without any negative physiological side effects even on extended image-viewing.

BRIEF DESCRIPTION OF THE DRAWINGS

The present invention is explained in more detail by way of the following examples of embodiments. In the corresponding drawings.

DETAILED DESCRIPTION OF PREFERRED EMBODIMENTS

EXAMPLE 1 (FIG. 1)

Figure 1:
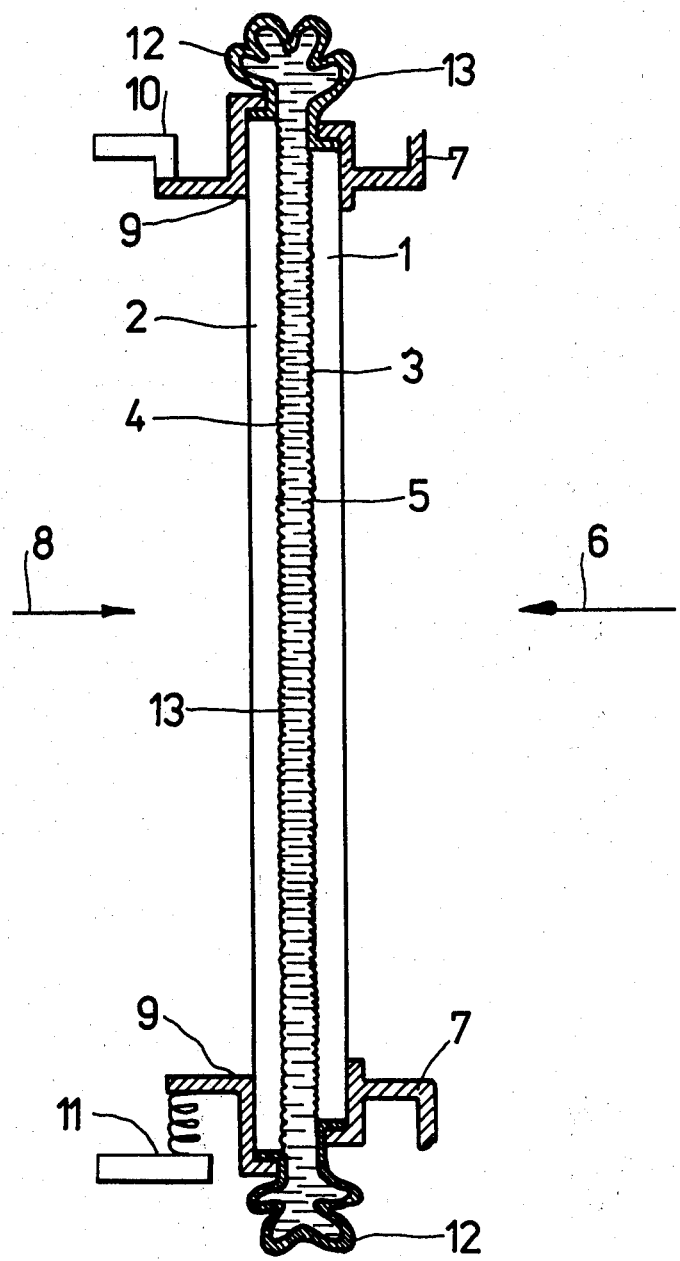
FIG. 1 represents a cross-section through a projecting screen of two solid light-scattering media which enclose an intermediate space filled with a non-scattering liquid, wherein the solid medium facing away from the observer is arranged to be movable.

Two glass disks 1 and 2 each with one side ground to a surface roughness 7.4 μm deep with a refractive index of $n_d^{20} = 1.728$ are assembled parallel to each other, in such a way that the roughened surfaces 3 and 4 face each other and space 5 of 0.004 mm width remains between them. The glass disk 1 facing the viewing direction 6 of an observer B is rigidly mounted in a frame 7. The glass disk 2 that faces the direction of incident light 8 is retained in a frame 9, which is connected to a mover 10 not illustrated in detail and is supported on a base 11 by means of a spring. Both frames 7 and 9 are connected with each other around the entire projecting screen arrangement with elastic sealing 12 in the manner of a bellows. This ensures an overall sealing of the intermediate space 5 which is filled with a liquid 13 having a non-scattering effect, which comprises ethylene glycol monoethylether in the present case with a refractive index of $n_d^{20} = 1.408$. A refractive index difference of $\Delta n_d^{20} = 0.320$ thereby results between surfaces 3 and 4 of glass disks 1 and 2 and the liquid filler.

By means of mover 10, not illustrated in detail, disk 2 which faces the incident light 8 is set in an eccentric rotational movement with an amplitude of 10 mm at a speed of 0.5 to 2.0 cm/sec. The bellows-shaped sealing 12 here ensures that no motional vibrations are transferred to the rigid plate 1.

Images reproduced on a projecting screen constructed and operated in this way are grain- and flickering- or scintillation-free at a transmission rate of 86% and a resolution of 29 linear pairs per mm.

EXAMPLE 2 (FIG. 1)

The arrangement for the projecting screen is the same as described in the Example of Embodiment 1, illustrated in FIG. 1. The two glass disks also have a refractive index of $n_d^{20} = 1.728$ here, however, being ground in each case into an average surface roughness of 4.9 μm in depth on one side. The liquid used between the disks is n-propanol with a refractive index of $n_d^{20} = 1.385$ and a layer thickness of 0.02 mm so that a difference in refractive index between the glass surfaces and the n-propanol of $\Delta n_d^{20} = 0.343$ results. It is possible to project grain- and flickering- or scintillation-free images at a transmission of 87% and a resolution of 33 linear pairs per mm by means of the motion conditions also described in Example 1.

EXAMPLE 3 (FIG. 1)

A projecting screen arrangement is constructed and operated in the same manner as described in Example of Embodiment 1 that has been illustrated in FIG. 1, wherein both disks comprise polycarbonate having a refractive index of $n_d^{20} = 1.585$, and which, in each case, has a single-sided surface roughness depth of 7.4 μm. They are arranged at a distance of 0.05 mm in relation to each other, the intermediate space between them being filled with water ($n_d^{20} = 1.335$). A refractive index difference of $\Delta n_d^{20} = 0.250$ between the polycarbon disks and the water results.

The images projected on a projecting screen constructed in this manner are grain- and flickering- or scintillation-free at a transmission rate of 85% and a resolution of 27 linear pairs per mm.

EXAMPLE 4 (FIG. 2)

A glass plate 21, ground on one side to have an average surface roughness depth of 16.8 μm and thereby scattering with a refractive index $n_d^{20} = 1.522$, and a second smooth, non-scattering glass plate 22 with the same refractive index are arranged parallel to each other in fixed positions so that an intermediate space 23 of 0.5 mm width remains. The scattering glass disk 21 is arranged herein on the side of viewing direction 24 of an observer B, while the non-scattering glass disk 22 that is smooth on both sides faces the direction of incident light 25. A liquid 26 flows through the intermediate space 23 in the direction of flow 27, which in the present case is water which contains as scattering solid particles 28, 0.8 mass-% flame-hydrolitically-produced, highly dispersive silicon dioxide with secondary particle size from 1 to 7 μm. Glass disk 21 is arranged here in such a way that its rough, scattering surface 29 bordering on intermediate space 23 is in direct contact with liquid 26 having the suspended solid particles 28 flowing through that space. The projecting screen is retained in a frame 31 with the aid of sealing material 30, the frame provided with connections 32 for the in- and outflow of the scattering suspension 26/28.

In the present case, a refractive index difference of $\Delta n_d^{20} = 0.187$ results between the surfaces of the glass disks 21 and 22 and the water serving as the liquid 26. Liquid circulation is activated by means of a pump (not illustrated) with a pump performance of 30 l/hr.

Grain- and flickering or scintillation-free images projected onto this projecting screen are reproduced at a transmission of 82% and a resolution of 33 linear pairs per mm.

EXAMPLE 5 (FIG. 2)

Figure 2:
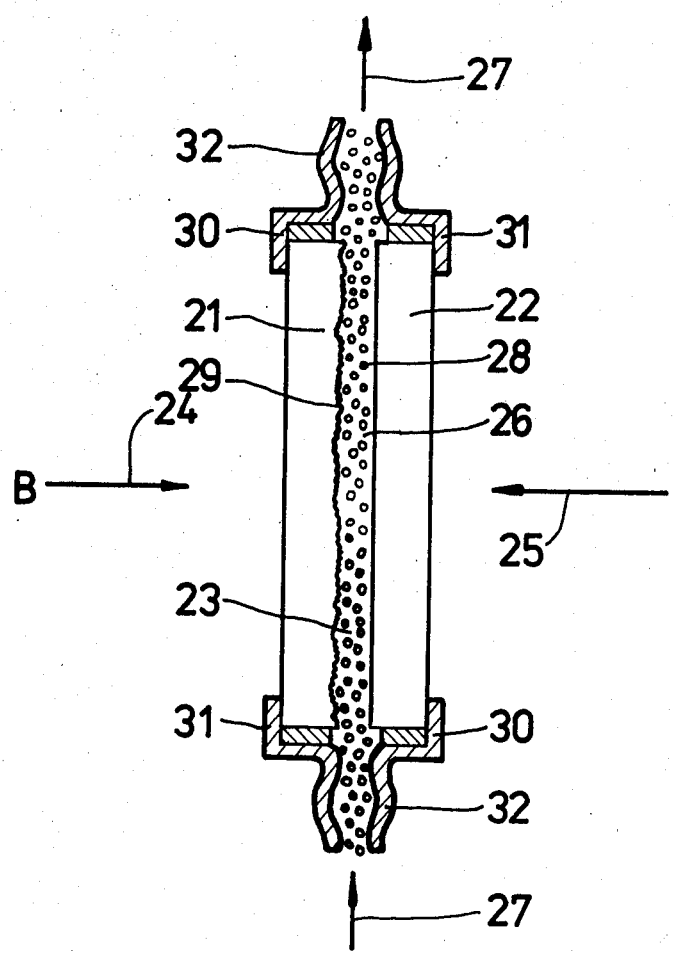
FIG. 2 represents a cross-section through a projecting screen of a solid light-scattering medium on the side facing the observer and a second solid, non-scattering medium on the side that is facing away from the observer, wherein both solid media are assembled in rigid form and enclose an intermediate space through which a liquid containing scattering solid particles flows.

The arrangement for the projecting screen is the same as described in the Example of Embodiment 4 illustrated in FIG. 2. The glass disks, of which the disk facing the observer has been ground on its inner side to have an average roughness depth of 7.4 μm, have a refractive index $n_d^{20} = 1.728$. The circulating liquid is 98.4 mass-% ethylene glycol monoethylester with a refractive index $n_d^{20} = 1.408$, wherein 1.6 mass-% polyethylene powder with an average particle size of 8 μm has been dispersed. A refractive index difference between the glass surfaces and the liquid of $\Delta n_d^{20} = 0.320$ results. The thickness of the liquid layer is 0.5 mm as in Example 4. Circulation of the liquid is also accomplished here by means of a pump with a pump performance of 30 l/hr.

The projected images are grain- and flickering- or scintillation-free at a transmission of 82% with a resolution of 30 linear pairs per mm.

EXAMPLE 6 (FIG. 2)

As described in Example 4 and illustrated in FIG. 2, two glass disks having a refractive index $n_d^{20} = 1.624$ are arranged at a distance of 0.5 mm from each other, wherein the inner side of the disk facing the observer has been ground to have an average roughness depth of 9.4 μm. The circulating liquid comprises 98.7 mass-% of a mixture of carbon tetrachloride with ethyl acetate, in a volumetric ratio of 4:1 with a refractive index of $n_d^{20} = 1.392$, into which 1.3 mass-% polyvinyl alcohol powder with an average particle size of 5 μm has been dispersed. In the present case, the refractive index difference between the glass surfaces and the liquid is $\Delta n_d^{20} = 0.232$. Circulation of the liquid is also accomplished in this case by means of a pump with a capacity of 30 l/hr.

The images reproduced on this projecting screen are grain- and flickering- or scintillation-free at a transmission of 80% and a resolution of 30 linear pairs per mm.

We claim:
1. A projecting screen comprising
   (A) two solid media which are movable with respect to one another, at least one of which is light-scattering with a surface roughness of 4.5 μm to 17 μm on one side thereof, the distance between opposite surfaces of said two media between 0.004 mm and 0.5 mm; and
   (B) a liquid between said two media (A), in which the refractive index differential $\Delta n_d^{20}$ between said liquid (B) and said solid media (A) is from 0.180 to 0.350.

2. The screen of claim 1 in which said liquid (B) is light-scattering.

3. The screen of claim 1 in which said liquid (B) does not scatter light.

4. The screen of claim 2 in which said liquid (B) contains solid scattering particles (C) of size 1 μm to 10 μm.

5. The screen of claim 4 in which
   (A) the two solid media are light scattering, and completely enclose
   (B) a light-scattering liquid, in which said solid medium positioned away from an observer is movable.

6. The screen of claim 4 in which said solid medium positioned towards an observer is light-scattering and said solid medium positioned away from an observer does not scatter light.

7. The screen of claim 1 in which said solid media (A) are constructed of glass.

8. The screen of claim 1 in which said solid media (A) are constructed of an organic polymer of at least one of polymethacrylic acid ester, acrylic acid ester, polyesters of isomeric phthalic acids, polycarbonates, polydiethylene glycol-bis-allylcarbonate, and copolymers of any of these enumerated organic compounds.

9. The screen of claim 1 in which said liquid (B) is selected from the group consisting of water, alcohols, glycol ethers, esters, halogenated hydrocarbons, and mixtures thereof.

10. The screen of claim 4 in which said solid scattering particles (C) are selected from at least one of silicic acid, polyethylene powder and polyvinyl alcohol.

11. The screen of claim 1 which reproduces projected images with a resolution of at least 25 linear pairs per mm and a transmission of at least 80%.

12. The screen of claim 3 in which the two solid media (A) are both light-scattering, with the media facing away from an observer being movable.

13. The screen of claim 2 in which the solid medium facing an observer is light-scattering and the second solid medium facing away from an observer does not scatter light.

14. The screen of claim 12 in which
   (1) each solid medium (A) has a refractive index $n_d^{20}$ of about 1.728,
   (2) each solid medium has one side with a surface roughness of about 7.4 μm,
   (3) each solid medium is positioned with the roughened surfaces facing each other about 0.004 mm apart,
   (4) said solid medium facing away from an observer is movable with respect to said solid medium facing an observer,
   (5) said liquid (B) comprises ethylene glycol monoethylether with a refractive index $n_d^{20}$ of about 1.408,
   (6) incident light passing in the direction from said movable solid medium to said solid medium facing an observer has an eccentric rotational amplitude of about 10 mm, at a speed of 0.5 to 2.0 cm/sec, and
   (7) an image reproduced in said projecting screen has a transmission of at least about 86% and a resolution of at least about 29 linear pairs per mm.

15. The screen of claim 12 in which
   (1) each solid medium (A) has a refractive index $n_d^{20}$ of about 1.728,
   (2) each solid medium has one side with a surface roughness of about 7.9 μm,
   (3) said liquid (B) comprises n-propanol having a refractive index $n_d^{20}$ of about 1.385 and a layer thickness of about 0.02 mm, and (4) an image reproduced on said projecting screen has a transmission of at least about 87% and a resolution of at least about 33 linear pairs per mm.

16. The screen of claim 12 in which
    (1) each solid medium (A) comprises polycarbonate with a refractive index $n_d^{20}$ of about 1.585,
    (2) each solid medium has one side with a surface roughness of about 7.4 μm,
    (3) each solid medium is positioned with the roughened surfaces facing each other about 0.05 mm apart,
    (4) said liquid (B) comprises water with a refractive index $n_d^{20}$ of about 1.335, and
    (5) an image reproduced on said projecting screen has a transmission of at least about 85% and a resolution of at least about 27 linear pairs per mm.

17. The screen of claim 13 in which
    (1) each solid medium (A) has a refracture index $n_d^{20}$ of about 1.522,
    (2) said solid medium facing an observer has one side with an average surface roughness of about 16.8 μm,
    (3) the solid media are positioned about 0.5 mm apart with the roughened surface of the light-scattering solid medium facing the non-scattering solid medium,
    (4) said liquid comprises water with a refractive index $n_d^{20}$ of about 1.335 and contains 0.8 mass percent of silicon dioxide particles with secondary particle size 1 to 7 μm,
    (5) said liquid (B) is circulated between said two solid media (A) at the rate of about 30 liter/hour, and
    (6) an image reproduced on this screen has a transmission of at least about 82% and a resolution of at least about 33 linear pairs per mm.

18. The screen of claim 13 in which
    (1) each solid medium (A) has a refractive index $n_d^{20}$ of about 1.728,
    (2) said solid medium facing an observer has one side with an average surface roughness of about 7.4 μm,
    (3) the solid media are positioned about 0.5 mm apart, with the roughened surface of the light-scattering solid medium facing the non-scattering solid medium,
    (4) said liquid (B) comprises about 98.4 mass percent ethylene glycol monoethylester with a refractive index $n_d^{20}$ of about 1.408 and contains about 1.6 mass percent polyethylene powder with an average particle size of about 8 μm,
    (5) said liquid (B) is circulated between said two solid media (A) at the rate of about 30 liter/hour, and
    (6) an image reproduced on this screen has a transmission of at least about 82% and a resolution of at least about 30 linear pairs per mm.

19. The screen of claim 13 in which
    (1) each solid media (A) has a refractive index $n_d^{20}$ of about 1.624,
    (2) said solid medium facing an observer has one side with an average surface roughness of about 9.5 μm,
    (3) the solid media are positioned about 0.5 mm apart, with the roughened surface of the light-scattering solid medium facing the non-scattering solid medium,
    (4) said liquid (B) comprises about 98.7 mass percent of a mixture of carbon tetrachloride with ethyl acetate in a volumetric ratio of about 4:1 and with a refractive index $n_d^{20}$ of about 1.392, and contains about 1.3 mass percent of polyvinyl alcohol powder of average particle size about 5 μm, and
    (5) an image reproduced on this screen has a transmission of at least about 82% and a resolution of at least about 30 linear pairs per mm.

* * * * *